Feb. 13, 1934.                    E. A. HOXIE                    1,947,204
                                CONTROL SYSTEM
                              Filed Aug. 27, 1931
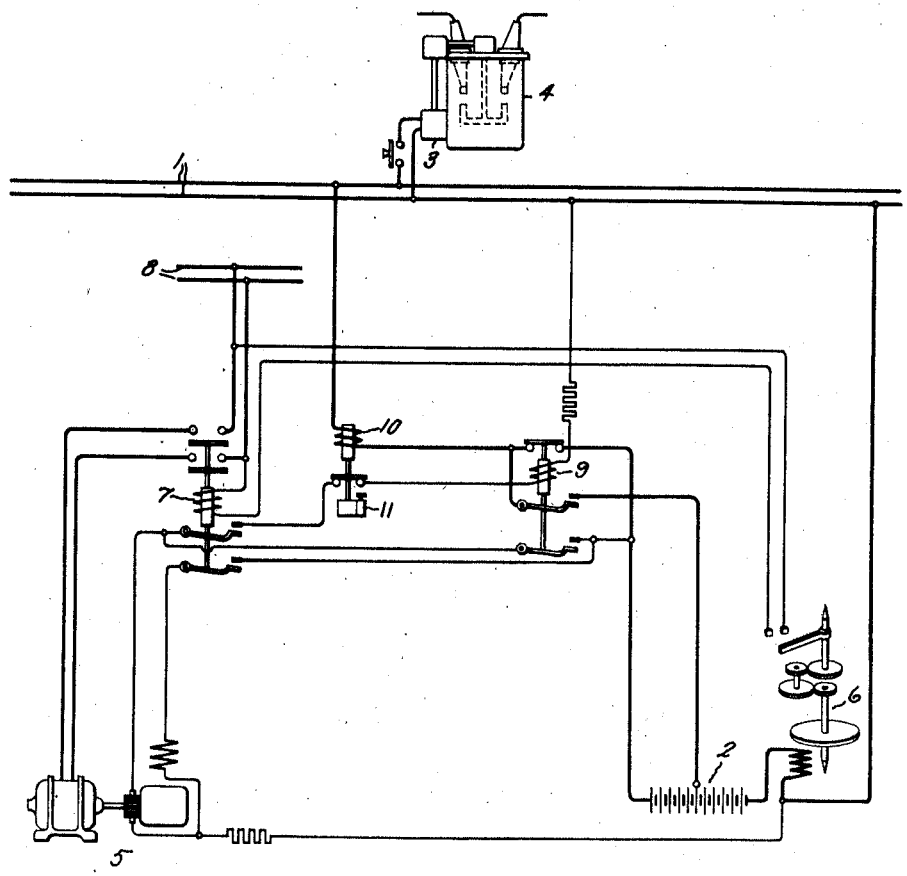
Inventor:
Earle A. Hoxie,
by Charles E. Mullen
His Attorney.

Patented Feb. 13, 1934

1,947,204

UNITED STATES PATENT OFFICE 1,947,204

CONTROL SYSTEM

Earle A. Hoxie, Lansdowne, Pa., assignor to General Electric Company, a corporation of New York Application August 27, 1931. Serial No. 559,743

4 Claims. (Cl. 171—314)

My invention relates to control systems and more particularly to control systems for storage batteries which energize substantially constant voltage supply circuits.

It is now generally recognized that the storage battery is one of the most dependable sources of direct current for the operation of control relays, protective equipment and circuit breakers in automatic, as well as manual, electric power stations. Batteries for such service are known as control batteries and they are usually connected to energize, what is referred to in the art as, a control bus to which the various station auxiliaries requiring direct current for their operation are connected. A control bus should have substantially constant voltage at all times because if the voltage gets low sufficient power may not be delivered to the relatively large power-consuming closing mechanisms of oil circuit breakers, with the result that a partial closure may ruin the breaker, while a high control bus voltage is detrimental to the operation of the continuously energized devices, such as control relays and other protective equipment.

Due to the relatively wide range of loads on a control bus an ordinary direct connected control battery will not maintain sufficiently constant voltage. In addition, the change in battery voltage due to its being charged further complicates the matter, this factor being especially prominent when nickel-iron alkaline type batteries are used.

In accordance with my invention I provide a control system which is particularly adapted for controlling storage batteries under varying conditions of load and charge. More specifically, I provide means for automatically disconnecting a part of the battery from the bus when it is being charged provided the load on the bus does not exceed a certain amount.

An object of my invention is to provide a new and improved control system.

Another object of my invention is to provide automatic means for changing storage battery connections in accordance with load conditions or charging conditions or both.

My invention will be better understood from the following description taken in connection with the accompanying drawing, and its scope will be pointed out in the appended claims.

Referring now to the single figure of the accompanying drawing, wherein I have illustrated diagrammatically an embodiment of my invention, 1 is a direct current supply circuit, such as a control bus in a power station, which is energized by a storage battery 2, and to which are connected the usual station auxiliaries including the closing and tripping means 3 of an oil circuit breaker 4. It is preferable to provide such an arrangement with charging means for the battery and accordingly I have shown automatically operating charging means, although manually controlled charging means may be employed if desired. This charging means may be of any well known type and I have illustrated it as comprising a motor-generator set 5, whose operation is controlled by an ampere hour meter 6 through an intermediate relay 7. I have shown a suitable source of alternating current, such as supply circuit 8, for energizing the motor of motor-generator set 5.

For controlling the connections of battery 2 to circuit 1 in accordance with the charging of the battery, I provide a relay 9. This relay is so arranged that when the battery is not being charged all of its cells are connected to control circuit 1, while when the battery is being charged the relay 9 automatically disconnects a portion of the battery from control circuit 1 so as to prevent an undue rise in voltage on this circuit. Due to the well known characteristics of storage batteries it is necessary to provide means of this sort, for when the battery is being charged its voltage increases appreciably. While this is true of all types of storage batteries, it is particularly true of the alkaline type such as the nickel-iron Edison battery.

For preventing a drop in voltage on circuit 1 when heavy loads are connected thereto, such as when the reclosing means 3 of circuit breaker 4 is operating, I provide a load responsive means in the form of a relay 10, whose operation on large loads causes all of the battery 2 to be connected to bus 1, provided it is not already so connected. As shown the contacts of this relay 10 are arranged to break the operating magnet circuit of relay 9.

The operation of my system is as follows: With the parts shown in the positions illustrated in the drawing the entire battery 2 is connected to bus 1 through the upper contacts of relay 9 and the operating magnet of relay 10. The charging equipment is inactive. After battery 2 has become discharged a predetermined amount, contacts of ampere hour meter 6 will close, thereby energizing the operating magnet of relay 7, which magnet is connected through the contacts of the meter 6 to the alternating current supply circuit 8. When this happens, relay 7 closes, thereby connecting the motor of the charging motor-generator set to the alternating current supply 8 through its upper contacts, connecting the operating magnet of relay 9 across the generator of motor-generator set 5 through the contacts of relay 10, and connecting the field winding of the generator of set 5 across the battery 2 through the two lower contacts of relay 7 respectively. When the generator voltage reaches the proper value, which is usually approximately two-thirds or three-fourths of the normal charging voltage, the magnet of relay 9 will be sufficiently energized to cause closure of this relay. As soon as this relay closes, its contacts act to disconnect a portion of battery 2 from bus 1. At the same time the charging circuit for the battery is completed through the lower contacts of relay 9. It will thus be seen that although the total battery voltage may increase while it is being charged the voltage of bus 1 will not be substantially increased because of the fact that a portion of the battery has been disconnected therefrom.

If now an unusually heavy load, such as the closing means of an oil circuit breaker, is connected to bus 1 its voltage would ordinarily tend to decrease. However, relay 10 is so calibrated that upon the occurrence of loads in excess of a predetermined amount sufficient to reduce the voltage to a value approaching the minimum safe value, it will open its contacts thereby breaking the magnet circuit of relay 9 with the result that the entire battery is automatically reconnected to the bus 1. This action is made sufficiently rapid to insure quick and positive closure of the circuit breakers, whose closing means are energized from the bus 1.

As soon as the heavy load is removed, relay 10 will reclose thereby again causing closure of relay 9. As soon as the charge, as measured by the ampere hour meter, has been completed, the contacts of the meter will open thereby deenergizing relay 7 which stops the motor-generator set and breaks the circuit of the operating magnet of relay 9, with the result that the entire battery is again connected to control bus 1.

It will thus be seen that I have provided an automatically operating arrangement for maintaining substantially constant voltage on a storage battery energized load circuit under varying conditions of load and charge.

During charging operations, that is to say, while relay 9 is energized, it will be seen that if relay 10 opens its contacts in response to a heavy load, the main circuit between the battery and bus 1 will be momentarily broken. This is because it is necessary to have a short time interval between the breaking of the intermediate contacts of relay 9 and the closing of its upper contacts so as to prevent a short circuit of the battery end cells. The momentary break will sometimes cause relay 10 to close again, thus causing it to chatter. A simple way to prevent this action is to provide relay 10 with a time delay closing characteristic, such as by the use of a dash-pot 11 as shown.

While I have shown and described particular embodiment of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States, is:

1. In combination, a load circuit, a storage battery connected thereto, charging means for said battery, and independent means responsive respectively to the simultaneous occurrence of relatively light load conditions on said circuit and to the charging of said battery for jointly causing disconnection of a portion of said battery from said circuit.

2. The combination with a control bus which is subjected to widely varying loads, of a storage battery for supplying energy to said bus, means for charging said battery, means operative with the charging of said battery for disconnecting a portion of said battery from said bus, and means operative in accordance with a predetermined large load on said bus for causing said entire battery to be connected to said bus.

3. In combination, a supply circuit, a storage battery connected to supply energy to said circuit, means responsive to the state of charge of said battery for charging it when its state of charge is below a predetermined low value, means responsive to the operation of said charging means for disconnecting a portion of said battery from said circuit, and means responsive to a predetermined high value of discharge current of said battery for causing the unconnected portion of said battery to be reconnected to said circuit during the operation of said charging means.

4. In combination, a supply circuit, a storage battery connected to energize said circuit, charging means for said battery, means responsive to the state of charge of said battery for controlling the operation of said charging means, means responsive to the operation of said charging means for disconnecting a portion of said battery from said circuit, and means responsive to a predetermined high value of discharge current of said battery for causing said last mentioned means to reconnect the disconnected portion of said battery to said circuit.

EARLE A. HOXIE.